(12) United States Patent
Marchesin et al.

(10) Patent No.: US 9,554,429 B2
(45) Date of Patent: Jan. 24, 2017

(54) LIGHTING CIRCUIT, IN PARTICULAR WITH LED LIGHT SOURCES

(71) Applicant: Automotive Lighting Italia S.p.A.A Socio Unico, Venaria Reale, Turin (IT)

(72) Inventors: Stefano Marchesin, Turin (IT); Andrea Englaro, Turin (IT); Matteo Iellina, Turin (IT)

(73) Assignee: Automotive Lighting Italia S.p.A. a Socio Unico, Turin (IT)

( * ) Notice: Subject to any disclaimer, the term of this patent is extended or adjusted under 35 U.S.C. 154(b) by 103 days.

(21) Appl. No.: 14/103,984

(22) Filed: Dec. 12, 2013

(65) Prior Publication Data

US 2014/0159576 A1 Jun. 12, 2014

(30) Foreign Application Priority Data

Dec. 12, 2012 (IT) .............................. PD2012A0376

(51) Int. Cl.
*B60Q 1/14* (2006.01)
*H05B 33/08* (2006.01)
*B60Q 1/00* (2006.01)

(52) U.S. Cl.
CPC ............ *H05B 33/0815* (2013.01); *B60Q 1/00* (2013.01); *H05B 33/0827* (2013.01); *H05B 33/0845* (2013.01)

(58) Field of Classification Search
USPC ..................... 315/76–84, 291–311
See application file for complete search history.

(56) References Cited

U.S. PATENT DOCUMENTS

| 8,115,414 | B2 * | 2/2012 | Zhao | H05B 33/0815 |
| | | | | 315/185 S |
| 8,314,757 | B2 * | 11/2012 | Osaka | H05B 33/0815 |
| | | | | 315/169.1 |
| 8,525,423 | B2 * | 9/2013 | Yu | G09G 3/3406 |
| | | | | 315/185 R |
| 8,653,756 | B2 * | 2/2014 | Szczeszynski | H05B 33/0815 |
| | | | | 315/185 R |
| 8,917,230 | B2 * | 12/2014 | Shin | H05B 33/0851 |
| | | | | 345/102 |

(Continued)

FOREIGN PATENT DOCUMENTS

WO 2012/063141 A1 5/2012

OTHER PUBLICATIONS

IT PD20120376 Search Report dated Aug. 29, 2013.

*Primary Examiner* — Brandon S Cole
(74) *Attorney, Agent, or Firm* — Howard & Howard Attorneys, PLLC

(57) ABSTRACT

A lighting circuit, in particular for a motor vehicle light, comprises at least one light source, particularly of the LED type, defined by a first voltage selection, a first selection circuit to identify said first voltage selection, at least one light source, particularly of the LED type, defined by a second voltage selection, and a second selection circuit to identify said second voltage selection. An electronic control unit configured to detect said first and second voltage selection of the light source, and to regulate the driving current absorbed by the light source defined by the lower voltage selection, so that said driving current follows with a constant ratio the trend of the driving current absorbed by the light source defined by the higher voltage selection, the latter being taken as reference.

20 Claims, 5 Drawing Sheets

(56) References Cited

U.S. PATENT DOCUMENTS

| | | | |
|---|---|---|---|
| 2009/0128045 A1* | 5/2009 | Szczeszynski | H05B 33/0815 |
| | | | 315/185 R |
| 2009/0146932 A1* | 6/2009 | Osaka | H05B 33/0827 |
| | | | 345/82 |
| 2011/0109231 A1 | 5/2011 | Shiu et al. | |
| 2012/0057103 A1 | 3/2012 | Cao et al. | |
| 2012/0176048 A1 | 7/2012 | Li et al. | |
| 2012/0306399 A1* | 12/2012 | Bazzani | H05B 33/086 |
| | | | 315/210 |
| 2013/0063042 A1* | 3/2013 | Bora | H05B 33/0845 |
| | | | 315/292 |
| 2015/0181659 A1* | 6/2015 | Kang | H05B 33/0809 |
| | | | 315/186 |

\* cited by examiner

LIGHTING CIRCUIT, IN PARTICULAR WITH LED LIGHT SOURCES

CROSS-REFERENCE TO RELATED APPLICATION

This application is based upon and claims priority to Italian Patent Application PD2012A000376 filed on Dec. 12, 2012.

BACKGROUND OF INVENTION

1. Field of Invention

The present invention relates to a lighting circuit, in particular with LED light sources, for making vehicle lights.

2. Description of the Related Art

As is known in the art, some light sources (LEDs in particular) are supplied by manufacturers classified according to their voltage, flow category, or flow selection. The term "voltage selection" refers to a voltage range within which the junction voltage characteristic of a category lies, as obtained by supplying the LED with its nominal current. The phrase "a light source having a certain flow selection" means that the source, when driven at nominal voltage, emits a luminous flow variable within a specific and limited predefined range.

In some applications (for example, in LED lighting for vehicle lights), the LED light sources of the lighting circuit are generally placed on separate electronic lighting circuit boards. In order for the electronic lighting circuit boards to have the same electric and photometric behaviour throughout the operating range of supply voltages, the lighting circuit must include lighting circuit boards fitting light sources having the same voltage and flow selection. From a practical point of view, this requires connecting the circuit boards mechanically during the SMT soldering process of the electric components to the circuit boards. However, this imposes restrictions and constraints with respect to the relative geometric position of the circuit boards. The circuit boards must be assembled simultaneously and must therefore comply with certain restrictions imposed by the wiring and positioning, restrictions during in-line assembly of the light, and material and process costs (because a selective soldering process must be provided for the mechanical soldering connection of the circuit boards). As a result, there is a need in the art to have greater flexibility in the production of the electronic circuit boards and reduced difficulty in the in-line assembly of the light.

SUMMARY OF THE INVENTION

The object of the present invention is to satisfy this requirement. In particular, a main object of the invention is to permit the realisation of a lighting circuit having light sources with different voltage and flow selections. This is achieved by a lighting circuit, an electronic control circuit board, a lighting circuit board, and a driver method of the present invention.

BRIEF DESCRIPTION OF THE DRAWINGS

Further characteristics and advantages of the invention will be more clearly comprehensible from the description given below of its embodiments, with reference to the appended drawings, wherein.

DETAILED DESCRIPTION OF THE EMBODIMENTS OF THE INVENTION

In the following description, the term "connected" refers both to a direct electrical connection between two circuits or circuit elements and to an indirect connection by one or more active or passive intermediate elements. The term "circuit" may indicate either a single component or a plurality of components, active and/or passive, connected to each other to achieve a predefined function. Moreover, where a bipolar junction transistor (BJT) or a field effect transistor (FET) can be used, the meaning of the terms "base", "collector", and "emitter" include the terms "gate", "drain", and "source" (and vice versa). Except as otherwise indicated, NPN type transistors may be used in place of PNP transistor (and vice versa).

Figure 1:
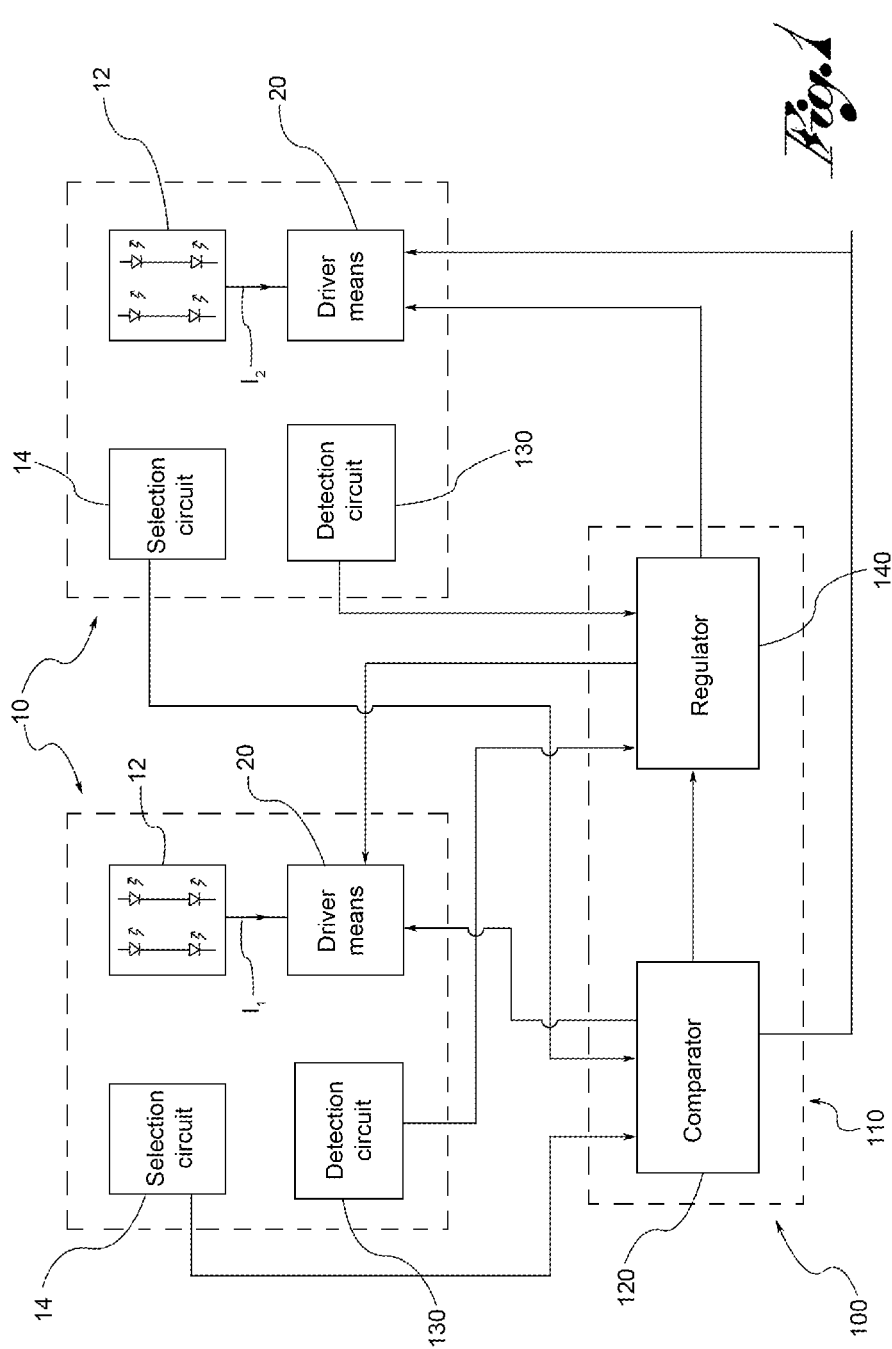
FIG. 1 is a block diagram of the lighting circuit according to the invention.

In one embodiment, the lighting circuit according to the present invention is shown in the block diagram in FIG. 1. The circuit includes at least two electronic lighting circuit boards 10, generally but not necessarily separate from each other, each including at least one light source 12, particularly of the LED type. The electronic lighting circuit boards are controlled by an electronic control unit 100, which can be mounted on its own electronic control circuit board 110 (as in the example shown) or on one of the electronic lighting circuit boards 10. For the purpose of simplifying the description, it will be assumed that the lighting circuit includes a first and a second lighting circuit board 10. It will however be clear to a person skilled in the art that the invention may be extended to a greater number of electronic lighting circuit boards 10.

The at least one light source 12 of the first lighting circuit board is defined by a first voltage selection and is susceptible to being driven by a first driving current 11; the at least one light source 12 of the second lighting circuit board is defined by a second voltage selection and is susceptible to being driven by a second driving current 12. Despite the invention setting out to resolve the problem of driving light sources with different voltage selections, as will be evident from the rest of the description, the invention is also applicable in the case of the same voltage selections. Consequently, the first voltage selection is generally different from the second voltage selection, but the case in which the first voltage selection and second voltage selection are the same is not excluded.

The idea behind the present invention is to make the electronic control unit 100 detect the value of the voltage selections, identify the higher one, and regulate the current absorbed by the light source defined by the lower voltage selection so that the driving current follows (with a constant ratio) the trend of the driving current absorbed by the light source defined by the higher voltage selection, the latter being taken as reference.

In particular, if the light sources 12 have the same flow selection (generate the same luminous flow when crossed by the same current), then the constant ratio is equal to one. In other words, the driving current of the lighting circuit board with the lower voltage selection is regulated so as to be equal to the driving current of the lighting circuit board with the higher voltage selection. In practice, the current absorbed by the light sources with the lower voltage selection (which would be greater than that of the light sources with the higher selection) is lowered so as to coincide with the latter. In yet other words, the voltage-current characteristics of the lighting circuit boards come to overlap.

In the case in which the flow selection of the light sources of one lighting circuit board is different from the flow selection of the light sources of another lighting circuit board, at a nominal supply voltage the same luminous flow is obtained with a specific ratio K between the driving currents ($I_2/I_1=K$). So, to resolve the problem of having the same luminous flow throughout the range of supply voltages, the circuit according to the invention acts so as to regulate the driving current of the lighting circuit board with the lower voltage selection so that its ratio to the reference current is constant and equal to the K value calculated at the nominal voltage. Consequently, to perform the same function (for example, the same light of a vehicle light), lighting circuit boards coming from panels of different circuit boards may be used that were manufactured at different times and that have different categories and voltage selections.

In the case of LED sources, there are four voltage categories (denominated 3A, 3B, 4A, 4B in the case of red LEDs) in a total voltage range from 1.9V to 2.5V. Each voltage category varies over a sub-range of 150 mV. For example, the voltage selection 3A is in a range of 1.9-2.05 V.

Consequently, because of the lighting circuit according to the invention, lighting circuit boards having light sources with a first voltage selection may be used (for example, 3A) together with lighting circuit boards having light sources with a second voltage selection (for example, 4B). The driving current absorbed by the first lighting circuit board is regulated (lowered), so as to follow the driving current absorbed by the second lighting circuit board. Despite having light sources with different characteristics, the two lighting circuit boards are controlled so as to have the same photometric behaviour. More specifically, each electronic lighting circuit board 10 may include, as in the example shown, a respective current driver 20 suitable to impose a driving current of the respective light source 12 (or of the respective light sources, for example in the case of LEDs). Moreover, each lighting circuit board 10 is provided with a respective selection circuit 14 suitable to identify the value of the respective voltage selection. The electronic control unit 100 detects the voltage selections with the selection circuits 14. Each selection circuit 14 includes at least one selection circuit element defined by an electric quantity selection having one of a plurality of predefined levels of electric quantity to which the same number of voltage selection levels of the light sources correspond.

In one embodiment, the circuit selector includes a resistor selection R_SEL having a resistance value chosen from a plurality of predefined resistance values. For example, in the case of four possible voltage selections, each lighting circuit board will mount one out of: a low impedance, high impedance, and two intermediate impedance value resistors, appropriately distanced from each other. Each electronic lighting circuit board may further include a detection circuit 130, which includes a circuit suitable for detecting a driving electric quantity of the light sources (for example, the driving current), when supplied with a power supply voltage. In one embodiment, the electronic control unit 100 may include at least one detection circuit 130 relative to an electronic lighting circuit board 10.

The electronic control unit 100 includes a comparator circuit 120, consisting of a circuit suitable for comparing the selection electrical quantities, or electrical quantities derivable from the selection electrical quantities, so as to identify (on the basis of the comparison) the lighting circuit board having the at least one light source with the higher voltage selection.

The electronic control unit may further include a regulation circuit 140 consisting of (for each of the electronic lighting circuit boards) a circuit regulator suitable for controlling the respective current driver 20 in such a way that the driving current of the lighting circuit board with the lower voltage selection follows the driving current of the lighting circuit board with the higher voltage selection with a constant ratio. In one embodiment of the invention, at least one electronic lighting circuit board 10 may include the relative circuit regulator so that the regulation circuit 140 is implemented on the electronic lighting circuit board.

The comparator circuit 120 is connected to the current driver 20 and to the regulation circuit 140 in such a way that the lighting circuit with the higher voltage selection is driven by the comparator circuit 120 with a reference driving current, and the driving current of the other lighting circuit board is regulated by the respective regulation circuit 140 so as to follow the reference current with a constant ratio.

With reference to the circuit diagram in FIG. 2, an example of practical implementation of the invention will be described below. In particular, the circuit diagram refers to lighting circuit boards 10 with 12 LEDs including at least one light source of the LED type with a driver type based on the use of a resistor (known as bin resistor) R_BIN_1; R_BIN_2, suitable to impose a driving current absorbed by the at least one LED. The lighting circuit board diagram is also known as an LED and resistors circuit. In this case, the detection circuit 130 detects the driving current and preferably (but not necessarily) uses the bin resistor R_BIN. In particular, the detection circuit 130 translates the voltage at the ends of the bin resistor R_BIN_1; R_BIN_2 into a proportional current Is_1; Is_2. It is to be noted that the detection circuit 130 (here described as belonging to the lighting circuit board 10) could also be placed on the control circuit board 110. In the same way, the regulation circuit 140 may be placed on either the lighting circuit board or the electronic control unit.

Figure 2:
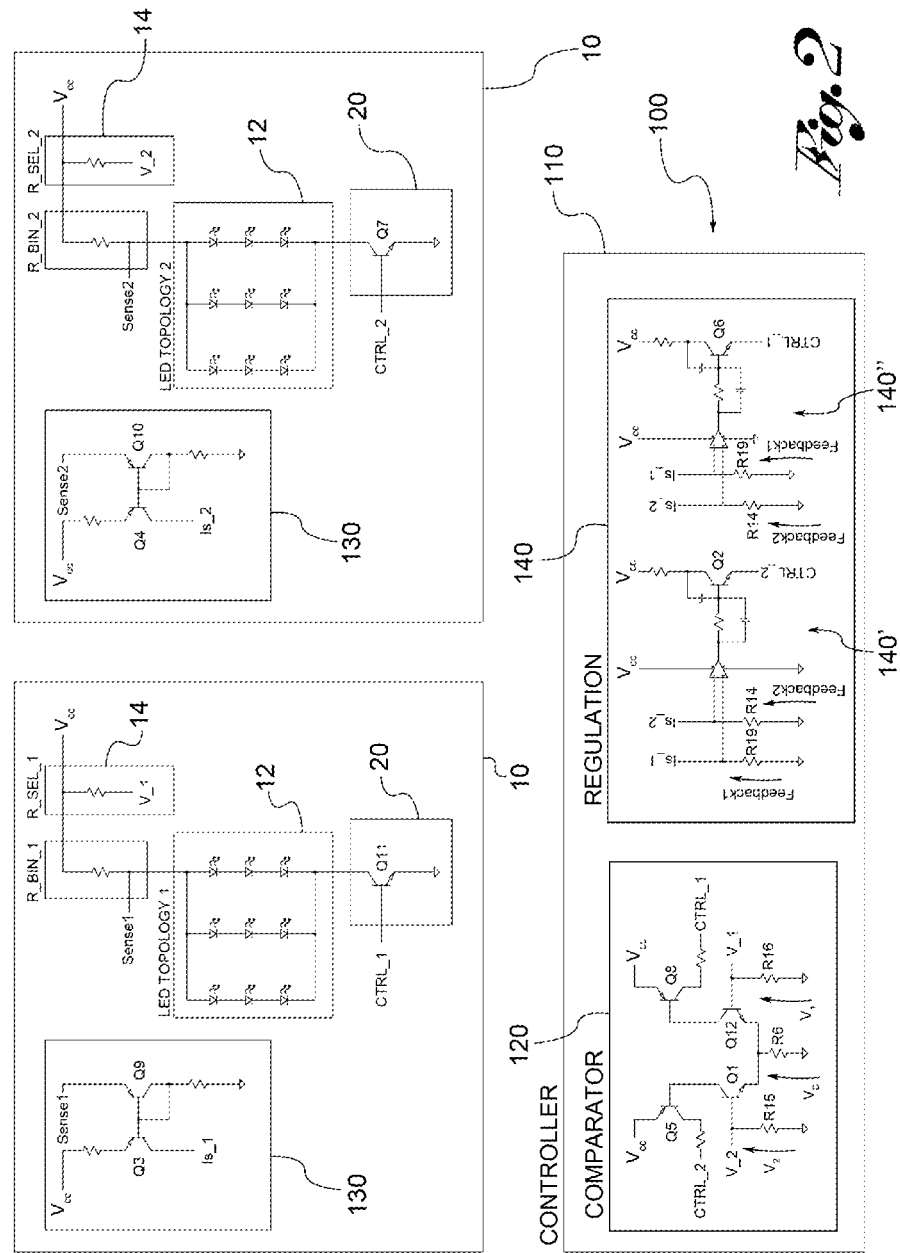
FIG. 2 is a block diagram of the lighting circuit according to the invention, in one embodiment.

Returning now to the detection circuit 130, in one embodiment it may be implemented with the circuit in FIG. 2. An analysis of the circuit shows that on the terminal Is_1; Is_2 a current Is proportional to the voltage at the ends of the bin resistor R_BIN, and thus to the driving current of the light sources, is present. Moving on to describe the electronic control unit 100, as said above it is provided with a circuit suitable to establish which of the lighting circuit boards has the highest voltage selection. To perform this function, a comparator circuit 120 is provided which compares electric quantities correlated to the selection resistors R_SEL of the lighting circuit boards, preferably voltage drops $V_1$; $V_2$ generated by the resistors. To obtain the voltage drops $V_1$; $V_2$ to compare, the circuit implementation shown in FIG. 2 uses a voltage divider for each lighting circuit board. Consequently, the input terminals V_1 and V_2 of the comparator circuit are at respective voltage values $V_1$; $V_2$ measured at the ends of the resistors R15, R16, equal to each other, which form the voltage dividers with the selection resistors RSEL_1 and RSEL2.

In the embodiment shown in FIG. 2, the comparator circuit 120 is substantially a differential amplifier which operates as follows: it is assumed that $V_1 > V_2$. By appropriately choosing the selection resistors, so that the voltage difference between $V_1$ and $V_2$ is such as to bar the transistor Q1 on the base of which $V_2$ is present, the voltage VD at the ends of the resistor R6 is made greater than $V_2$ and thus the transistor Q1 is off. This implies that the PNP-type transistor Q5, the base of which is connected to the collector of Q1, is also barred and no current circulates throughout the branch of the comparator relative to $V_2$. Conversely, the transistor Q12 (on the base of which $V_1$ is present) is in saturation or in linear zone (on) and also turns on the PNP-type transistor Q8 the base of which is connected to the transistor Q12. Thus, depending on the value of $V_1$ and $V_2$, the differential amplifier moves to one side or the other and makes current circulate on only one of the output terminals CTRL_1, CTRL_2.

In one embodiment of the lighting circuit, the case of $V_1 = V_2$ is prevented so as to simplify the comparator circuit which needs only discriminate two situations as opposed to three. To accomplish this, lighting circuit boards with the same voltage selections mount slightly different selection resistors. For example, two lighting circuit boards with 3 A voltage selection will respectively have a resistor of 0 ohm and a resistor of 1 kohm Consequently, the comparator circuit will detect one voltage $V_1$ or $V_2$ higher than the other.

Moving to the description of the regulation circuit 140 illustrated in FIG. 2, the output terminals CTRL_1 and CTRL-2 of the comparator circuit are connected to respective transistor emitter terminals Q6 and Q2, the base of which is connected to the output of a respective operational amplifier U2, U1 of the regulation circuit. At the input terminals of each operational amplifier two voltage signals feedback1 and feedback2 are carried deriving from the output currents IS_1, IS_2 of the current detection circuits, the voltage signals being obtained from the respective current (for example, by input resistors R14, R19). The regulation circuit illustrated in FIG. 2 thus includes two separate feedback circuits 140', 140" each based on a respective operational amplifier U1, U2. These circuits operate in mutual exclusion, in that the respective operational amplifiers U1, U2 have at their respective inverting and non-inverting inputs, the respectively inverted signals feedback1 and feedback2.

In addition, the regulation circuit includes a driver, such as a driving switch 20 (for example an NPN transistor) for each lighting circuit board. The driver drives a respective driving current on the at least one light source of the LED type of a lighting circuit board, so as to comply with the driving current on at least one light source of the LED type of the other lighting circuit board taken as reference, as is explained further below. Each feedback circuit forms a feedback loop which includes the output terminal of the operational amplifier U1; U2, the base of the output transistor Q2; Q6, the emitter of the output transistor, and the base of the driving transistor Q7; Q11. The lighting circuit according to the invention is made in such a way that the operational amplifier of the regulation circuit, which should regulate the lighting circuit board with the higher voltage selection (which acts as reference) cannot close the feedback. In other words, the operational amplifier cannot close the loop to perform a negative feedback and will consequently have one of its outputs CTRL_1 or CTRL_2 undetermined or not useful for controlling the respective driving transistor.

The comparator circuit 120 acts in a complementary manner to the regulation circuit. In particular, the side of the comparator circuit which caused the undetermined state of the respective feedback circuit of the regulation circuit has an output suitable to send the driving transistor of the relative lighting circuit board 20 in saturation, thus identifying the circuit board which will act as reference. Vice versa, the output of the comparator circuit (which current does not circulate in) is suitable for controlling the respective feedback circuit so that it is able to close the feedback. The driving circuit 20 is then regulated so that the respective detection circuit provides an output signal which, carried to the input of the respective operational amplifier, closes the feedback loop. In other words, the operational amplifier, on the basis of its inputs feedback1 and feedback2, provides an output signal suitable to make the inputs equal.

From the description it is clear that the lighting circuit board with the highest selection out of all the possible voltage categories will be a reference circuit board; similarly, the lighting circuit board with the lowest voltage selection out of all the possible voltage categories will be regulated. Consequently, during the step of assembling the lighting circuit boards with the extreme voltage selections (for example 3 A and 4 B for the red LEDs), the assembly of some components may be avoided. For example, in the presence of a lighting circuit board with the highest voltage selection, there is no need to mount the respective part of the regulation circuit, that is to say the driver (for example, the driving switch 20). In fact, since the driving switch 20 will work in saturation, it may be replaced by a simple and economical jumper at 0 ohm. Moreover, if the lighting circuit board with an extreme voltage selection is integrated in the electronic control circuit board, the comparator circuit need not be mounted, in that it is already known which is the circuit board to be regulated, and which is the reference circuit board.

The above, with reference to the circuit diagram in FIG. 2, was relative to an LED driving circuit of the LED and resistors type. The invention will now be described applied to the LED driving type with current regulation. In particular, only the circuits different from the above case will be described. In one embodiment of the current regulated circuit, the driver of each lighting circuit board is composed of an integrated device, known as an integrated LED driver. Functionally, the integrated LED driver reads the current which crosses it and compares it to a reference electric quantity which the driver generates internally and which may be voltage or a current. Externally to the driver, to set the final output current, an electric component is connected (for example, a resistor). If, for example, the LED integrated driver generates a reference electric current, the current is made to pass through the external setting resistor of the current, and the driver compares the voltage at the ends of the external setting resistor of the current with the voltage detected at the ends of the inner sensing resistor generated by the driver current. The driver thus acts so that these two currents are the same, or in a clearly defined ratio.

Figure 3:
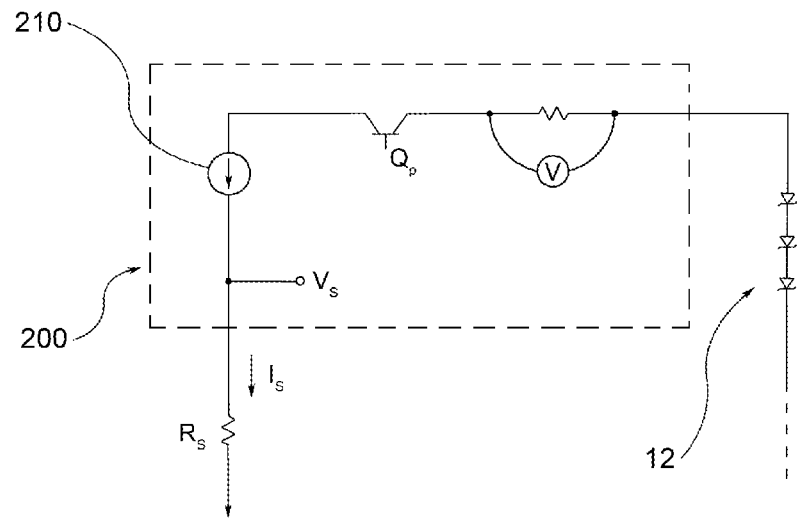
FIG. 3 is a block diagram of a part of the lighting circuit, in another embodiment.

FIG. 3 is a circuit diagram of an integrated LED driver 200 utilisable in the lighting circuit according to the invention, to which a row of LEDs 12 is connected. The integrated LED driver 200 generates a reference voltage Vs (for example, by a current or voltage generator 210). As well as the row of LEDs 12, a setting resistor RS is connected to the driver 200. Internally, the driver is able to measure the voltage generated by the driving current $I_0$ on an inner resistor (for example, by a voltmeter V). The integrated driver is able to compare the current Is through the setting resistor RS with the current which crosses the inner resistor. If K is a pre-set constant of proportionality, the driver acts so that IO=K*Is. To achieve this, the driver is provided with a driving transistor Qp, which closes the feedback.

Figure 4:
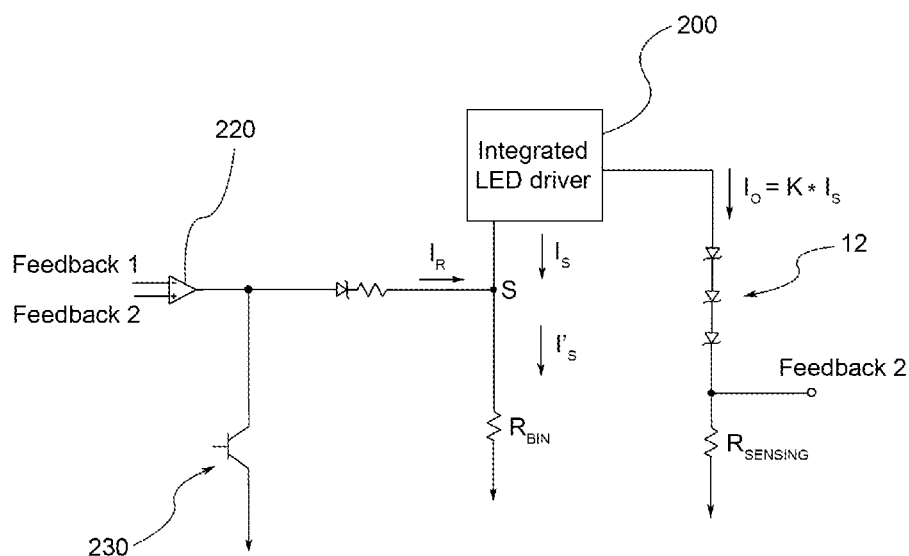
FIG. 4 is a block diagram of the lighting circuit according to the invention, in a further embodiment.

With reference now to FIG. 4, the method of applying the integrated LED driver 200 to each lighting circuit board of the circuit according to the invention will now be described. In the diagram in FIG. 4, the setting resistor of the current Rs mentioned above is the bin resistor RBIN. According to the invention, the output currents of the integrated drivers on the respective lighting circuit boards need to be kept at a defined ratio. As in the case above, each lighting circuit board is provided with a detection circuit of a driving quantity (for example, the current) which supplies a feedback signal feedback1; feedback2 to the regulation circuit. Further, a comparator circuit is provided which operates in mutual exclusion with the regulation circuit. The operator circuit acts in the same way described above to identify which is the reference lighting circuit board. The method of performing the regulation will now be described. Regulation is achieved by connecting to the integrated LED driver 200 the output of an operational amplifier 220 on the input terminals of which the feedback1 and feedback2 feedback signals coming from the two lighting circuit boards 10 are carried. On the output terminal of the operational amplifier, a feedback current IR is present which tends to cancel out the difference between the two feedback signals. Applying Kirchoff's law to the connection node S between the output of the operational amplifier and the integrated LED driver, one has:

$I_S + I_R - I'_S = 0$, where S is the current on the bin resistor $R_{BIN}$.

Normally, without the regulation according to the invention, $I_R = 0$ and $I_S = I'_S$. This is also the case of the reference lighting circuit board (which does not require regulation). To zero the feedback current $I_R$, one may connect a control transistor 230 to the output of the operational amplifier 220. The control transistor 230 can be controlled by the comparator circuit in such a way that if the transistor is turned on (conducts current) the potential at the output of the operational amplifier and thus the current $I_R$ will be equal to zero.

In the case of the lighting circuit board which must be regulated, the comparator circuit imposes that the control transistor 230 operates as an open circuit. The operational amplifier 220 is thus able to supply the feedback current $I_R$, which tends to cancel out the difference between the feedback signals feedback1 and feedback2 coming from the detection circuits of the respective lighting circuit boards. So, the feedback loop closes with the feedback at the input of the operational amplifier. Consequently, the $I_S$ current which is that coming out of the integrated LED driver 200 for obtaining the driving current through the constant K, is equal to the $I'_S - I_R$, with $I_R > 0$, given that the regulation is performed.

Figure 5:
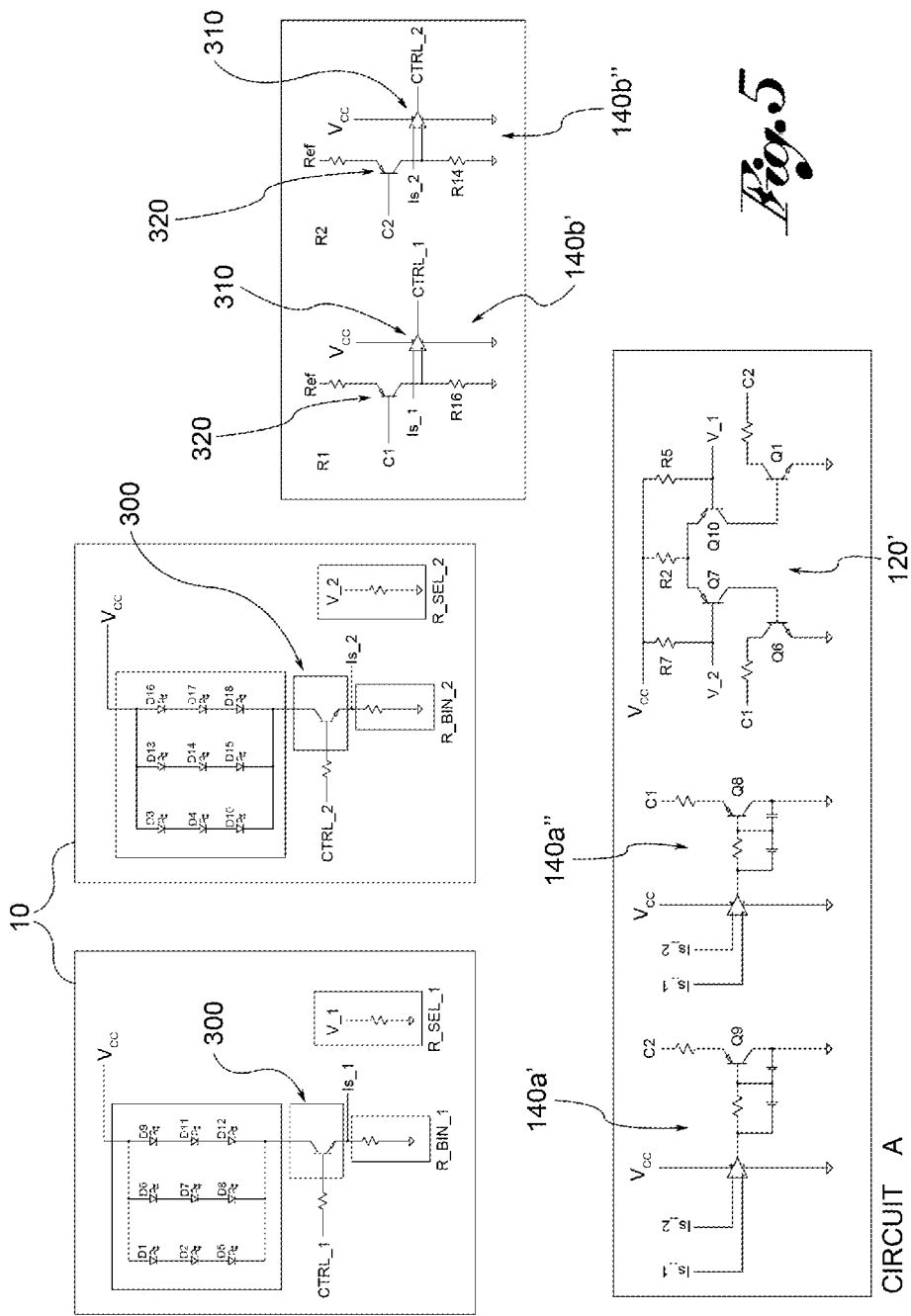
FIG. 5 is a block diagram of the lighting circuit in an embodiment variant compared to the circuit in FIG. 4.

With reference to the circuit diagram in FIG. 5, an embodiment variation of the current regulated circuit will now be described, wherein, in place of the integrated LED drivers 200, the drivers are made with discreet electronic components, in particular with a driving transistor 300 controlled by the output of the operational amplifier 310. Normally, at the inverting input of the operational amplifier 310, a voltage proportional to the driving current is carried, while on the non-inverting input a reference voltage VRef is present. The method by which such a circuit configuration may also implement the technical solution which the present invention is based on, will now be described. The electronic control unit again includes a comparator circuit 120' which, despite being slightly different from that described above for reasons of convenience of circuit, functions in exactly the same manner to identify the lighting circuit board with the highest voltage selection on the basis of the comparison of the voltages $V_1$ and $V_2$ representing the voltage selections. The electronic control unit further includes a regulation circuit which, for each lighting circuit board, is formed of a control stage 140a', 140a'' and of a regulation stage 140b', 140b''. The control stage is connected to the non-inverting input of the operational amplifier 310 which controls the driving transistor 300, and is controlled by the control stage. More specifically, the regulation stage includes a regulation transistor 320 (for example of the PNP type) having the emitter connected to a reference voltage VRef, the collector connected to ground by a pull-down resistor R14; R16 and the base connected to a control terminal C_1; C_2 of the control stage.

The control stage is equivalent to the feedback circuit described for the case of LED driving of several resistors in FIG. 1, that is to say works to close the feedback loop to cancel out the difference between the feedback signal IS_1; IS_2 coming from the respective detection circuits only in the presence of a determined level of control signal C_1; C_2 coming from the comparator circuit. In particular, each control signal C_1; C_2 may, depending on the level it assumes, polarise the regulation transistor 320 so that it operates in saturation or in linear zone. The control signal which controls the lighting circuit board which must act a reference will then make the regulation transistor work in saturation, so that the voltage on the non-inverting input of the operational amplifier depends exclusively on the reference voltage VRef according to a predetermined resistance ratio. The control signal which controls the lighting circuit board which must be regulated to conduct a driving current which follows the reference current according to a constant ratio, will then make the regulation transistor 320 work in linear zone, so that the voltage on the non-inverting input of the operational amplifier 310 is proportional to the output of the operational amplifier of the control stage (tends to cancel out the difference between the feedback signals coming from the detection circuits).

Figure 6:
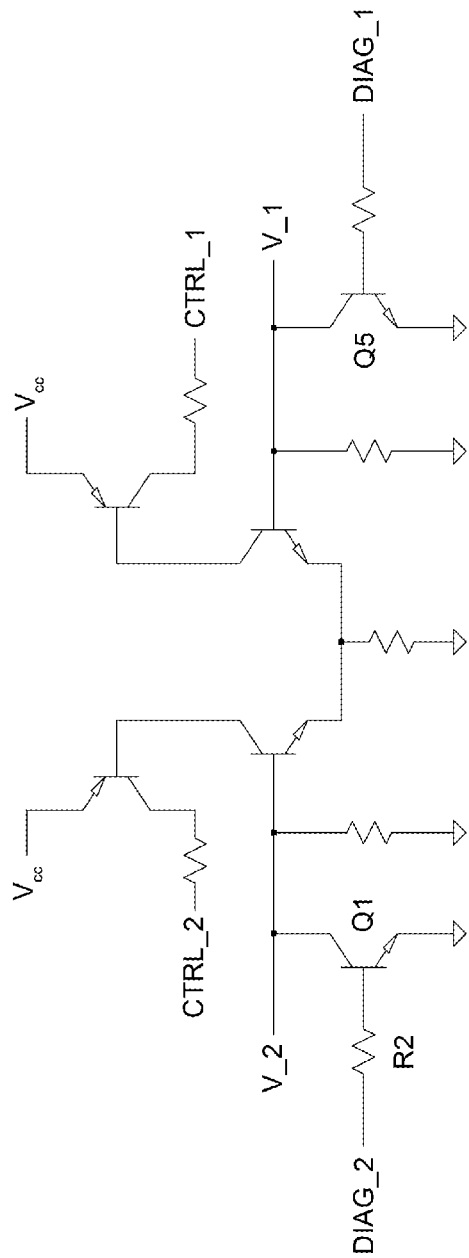
FIG. 6 is a block diagram of the comparator circuit for a driver circuit of lighting circuit boards having different functions.

The above description refers to lighting circuit boards suitable to perform the same function, in particular the same vehicle light (for example, a brake light, side light, reverse light, indicator light, fog light, dipped beam headlight, or full beam headlight). However, the invention may also be applied to the case in which the lighting circuit boards perform different functions, for example different lights of a vehicle, so that they come on and off in a uniform manner. For example, consider a brake light realised with two LED lighting circuit boards and a side light realised with an LED lighting circuit board. These two lights should function in a uniform manner. Consequently, as described above, the electronic control unit determines the lighting circuit board with the worst voltage selection (the highest) and regulates the current of the other lighting circuit boards. However, unlike the case in which the circuit boards perform the same function, where in the event of failure of one the other must also be turned off, in the case of circuit boards performing different functions the case may arise in which if one goes off (for example, a brake light) the other must stay on (for example, a side light). To overcome this problem, the comparator circuit 400 for lighting circuit boards with different functions is modified as shown in FIG. 6. The central structure of the comparator is identical to that described above, with the addition of a diagnostic transistor Q1; Q5 on each branch, connected between the input terminals V_1, V_2 of the comparator circuit and ground, and controlled by a respective diagnostic signal DIAG_1; DIAG_2 coming from a respective lighting circuit board.

When a failure occurs on a lighting circuit board and the relative diagnostic signal is activated, the corresponding branch of the comparator (if it was on and was thus relative to the reference circuit board) goes off. Automatically, the other branch which was off turns on and thus acts as reference. In the presence of a diagnostic signal, the diagnosis transistor conducts and thus the relative branch being in pull-down, the voltage on the input terminal of the branch becomes inferior to the voltage on the input terminal of the other branch. Consequently, the lighting circuit board which functions correctly but initially was not the reference circuit board, does not go off following the failed circuit board going off but becomes the reference circuit board and remains on.

A person skilled in the art may make modifications and adaptations to the embodiments of the lighting circuit according to the invention, replacing elements with others functionally equivalent so as to satisfy contingent requirements while remaining within the scope of protection of the following claims. For example, the electronic control unit may be implemented in software mode, for example, using a micro controller processing unit or a DSP to make the levels definition and acquisition circuits.

What is claimed is:

1. A lighting circuit, in particular for a motor vehicle light, comprising:
    at least one light source defined by a first voltage selection and susceptible to being driven by a first driving current;
    a first selection circuit to identify said first voltage selection;
    at least one light source defined by a second voltage selection and susceptible to being driven by a second driving current;
    a second selection circuit to identify said second voltage selection;
    wherein each of said first and second selection circuit includes at least one selection circuit element defined by a selection electric quantity having one of a plurality of predefined levels of electric quantity to which the same number of voltage selection levels of the light sources correspond;
    an electronic control unit configured to detect said first and second voltage selection of the light source by said first and second selection circuit, and to regulate the driving current absorbed by the light source defined by the lower voltage selection, so that said driving current follows with a constant ratio the trend of the driving current absorbed by the light source defined by the higher voltage selection, the latter being taken as reference;
    at least a first electronic lighting circuit board including at least said light source defined by the first voltage selection and said first selection circuit;
    at least a second electronic lighting circuit board including at least said light source defined by the second voltage selection and said second selection circuit;
    wherein the electronic control unit includes:
    a current driver for each electronic lighting circuit board, said current driver being suitable for imposing a driving current of the respective light source;
    a comparison circuit including a circuit suitable for comparing said selection electrical quantities, or electrical quantities derivable from said selection electrical quantities, so as to identify, on the basis of such comparison, the lighting circuit board having the at least one light source with the higher voltage selected;
    a detection circuit for each of said electronic lighting circuit boards, wherein the detection circuit includes a circuit suitable for detecting a driving electric quantity of the light sources when powered with a power supply voltage; and
    a regulation circuit including, for each of the electronic lighting circuit boards, a circuit regulator suitable for controlling the respective current driver in such a way that the driving current of one lighting circuit board follows the driving current of the other lighting circuit board with a constant ratio, and wherein said comparator circuit is connected to said current driver and to said circuit regulator in such a way that the lighting circuit with the higher voltage selection is driven by the comparator circuit with a reference driving current, and the driving current of the other lighting circuit board is regulated by the respective circuit regulator so as to follow said reference current with a constant ratio.

2. A lighting circuit as set forth in claim 1, wherein said circuit selection element is a selection resistor having a resistance value chosen from a plurality of predefined resistance values.

3. A lighting circuit as set forth in claim 1, wherein the first and the second lighting circuit boards are separate from each other and their respective light sources have different or the same respective voltage selections.

4. A lighting circuit as set forth in claim 1, wherein the comparator includes, on each branch, a diagnostic transistor connected between the input terminals of the comparator circuit and ground and commanded by a respective diagnostic signal coming from a respective lighting circuit board, the comparator being configured in such a way that when a failure is detected on one lighting circuit board and the relative diagnostic signal is activated, the corresponding branch of the comparator circuit turns off, while the other branch which was off, turns on and thus acts as reference.

5. A lighting circuit as set forth in claim 1, wherein the circuit regulator includes, for each lighting circuit board, an operational amplifier on the inputs of which voltage values corresponding to the driving currents of the lighting circuit boards are carried and the output of which is connected both to the respective current driver and to a respective control signal coming from the comparator circuit, said circuit regulator being configured in such a way that, in the presence of a first level of said control signal, said output is suitable for controlling the respective current driver and, in the presence of a second level of said control signal, said output is not able to control the respective current driver.

6. A lighting circuit as set forth in claim 5, wherein the voltage values corresponding to the driving currents of the lighting circuit boards are carried inverted with each other on the inputs of the operational amplifiers of the regulation circuit.

7. A lighting circuit as set forth in claim 5, wherein the comparator circuit has at least two output terminals for respective control signals, said output terminals being connected to a respective circuit regulator of the regulation circuit and to a respective current driver, the comparator circuit being configured in such a way that, depending on the comparison of the electric quantities representative of the voltage selections of the lighting circuit boards, each control signal may assume a first level suitable for permitting the respective circuit regulator to perform the regulation of the driving current or a second level suitable to prevent said regulation and to command the respective lighting circuit board to power the lighting sources with a reference current depending exclusively on the circuit parameters of said lighting circuit board.

8. A lighting circuit as set forth in claim 1, wherein the current driver of the lighting circuit boards includes a driving current switch having the base terminal connected to a respective output terminal of the comparator circuit and to a respective output terminal of the regulation circuit, so that when the control signal of said output terminals is at said first level, said driving switch is commanded by the regulation circuit to operate in a linear zone to regulate the driving current to assume a value according to a constant ratio with the reference current and, when the control signal of said output terminals is at said second level, said driving current switch is commanded by the comparator circuit to operate in the saturation zone.

9. A lighting circuit as set forth in claim 1, wherein said current driver is configured to carry out a current regulation of the driving current, and wherein, when the control signal of said output terminals is at said first level, said current driver is commanded by the regulation circuit to carry out a regulation of the driving current in such a way as to assume a value according to a constant ratio with the reference current which circulates in the light sources of another lighting circuit board having the higher voltage selection, and when the control signal of said output terminals is at said second level, said current driver carries out the regulation of the driving current on the basis of a reference electric quantity inside the lighting circuit board.

10. A lighting circuit as set forth in claim 1, wherein said current driver includes an integrated electronic device suitable for generating a driving current on the basis of a internal reference electric quantity, and wherein an input of said integrated electronic device is connected to the output terminal of the respective circuit regulator, a control switch suitable for being commanded by the comparator circuit to disable said circuit regulator being connected to said output terminal.

11. An electronic control circuit board of light sources, where said light sources are mounted on at least two separate electronic lighting circuit boards, one of which being suitable for being implemented with the electronic control circuit board, wherein the light sources mounted on a first circuit board have a first voltage selection different from a second voltage selection of the light sources mounted on a second circuit board, comprising:
a comparison circuit, including a circuit suitable for comparing selection electrical quantities, representative of the different voltage selections of the light sources, so as to identify, on the basis of the result of such comparison, the circuit board having the lighting sources with the higher voltage selection; and
a regulation circuit including, for each of the electronic lighting circuit boards, a circuit regulator having input terminals which electric signals representative of the driving currents of the light sources of the lighting circuit boards are carried on, said circuit regulator being suitable for controlling respective lighting circuit boards in such a way that the driving current of one lighting circuit board is in a constant ratio with the driving current of another lighting circuit board, taken as reference,
wherein said comparator circuit has output terminals, each connected to a respective regulator and to a respective current driver of the light sources in such a way that, depending on the level of the control signal present on said output terminals, said circuit regulators are enabled or disabled to control the respective lighting circuit board, the level of the control signal which disables the circuit regulators being suitable for controlling the respective current driver in such a way that they supply a reference driving current independent of the driving currents of the other lighting circuit boards.

12. An electronic control circuit board as set forth in claim 11, wherein said regulator includes, for each lighting circuit board, an operational amplifier on the inputs of which said electric signals representative of the driving current are carried and the output of which is connected to the base of a control transistor the emitter of which is connected to a respective output terminal of the comparator circuit.

13. An electronic control circuit board as set forth in claim 11, wherein said regulator includes, for each lighting circuit board, an operational amplifier on the inputs of which said electric signals representative of the driving current are carried and the output of which is connected to the collector of a control transistor commanded by the comparator circuit.

14. An electronic control circuit board as set forth in claim 11, including a current driver for each electronic lighting circuit board, said current driver being suitable for imposing a driving current of the respective light source.

15. An electronic lighting circuit board as set forth in claim 11, including at least one lighting source and a selection circuit consisting of at least one circuit selection element, defined by an electric quantity having one of a plurality of pre-established electric quantity levels, said selection circuit being connectable to said comparator circuit of the control circuit board.

16. A lighting circuit board as set forth in claim 15, including a detection circuit consisting of a circuit suitable for detecting the driving current of the light sources when powered with a power supply voltage, said detection circuit being connectable to said regulation circuit of the control circuit board.

17. A lighting circuit board as set forth in claim 15, including a current driver suitable for imposing a driving current of the respective light source.

18. A driver method of light sources, particularly of the LED type, where said light sources include at least a first light source defined by a first voltage selection and susceptible to being driven by a first driving current, and at least a second light source defined by a second voltage selection and susceptible to being driven by a second driving current, wherein
said first light source and a first selection circuit to identify said first voltage selection are placed on a first electronic lighting circuit board;
said second light source and a second selection circuit to identify said second voltage selection are placed on a second electronic lighting circuit board;
and wherein each selection circuit comprises at least one selection circuit element defined by a selection electric quantity having one of a plurality of predefined levels of electric quantity to which the same number of voltage selection levels of the light sources correspond;
the method comprising the steps of:
detecting said voltage selections of the light sources;
identifying the highest voltage selection; and
regulating the driving current of the other light source so that said driving current follows with a constant ratio the trend of the driving current absorbed by the light source defined by the higher voltage selection, the latter being taken as reference, imposing, for each electronic circuit board, a driving current of the respective light source using a driving current circuit;

comparing said selection electrical quantities, or electrical quantities derivable from said selection electrical quantities by using a comparator circuit, so as to identify, on the basis of such comparison, the lighting circuit board having the at least one light source with the higher voltage selection;

detecting a driving electric quantity of the light sources when powered with a power supply voltage by using a detection circuit, controlling the respective driving current circuit by using a regulation circuit in such a way that the driving current of one lighting circuit board follows the driving current of the other lighting circuit board with a constant ratio, and wherein the lighting circuit with the higher voltage selection is driven by the comparator circuit with a reference driving current, and the driving current of the other lighting circuit board is regulated by the regulation circuit so as to follow said reference current with a constant ratio.

19. A driver method as set forth in claim 18, wherein the steps of detecting and identifying include:

associating to light sources having different voltage selections respective selection circuits; and comparing electric quantities generated by said selection circuits.

20. A driver method of light sources, particularly of the LED type, where said light sources comprise at least a first light source defined by a first voltage selection and susceptible to being driven by a first driving current, and at least a second light source defined by a second voltage selection and susceptible to being driven by a second driving current, the method comprising the steps of:

associating to light sources having different voltage selections respective selection circuits;

comparing selection electrical quantities generated by said selection circuits, or electrical quantities derivable from said selection electrical quantities, so as to identify, on the basis of such comparison, the at least one light source with the higher voltage selection;

driving the lighting circuit board with the higher voltage selection with a reference driving current; and regulating the driving current of the other lighting circuit board so as to follow said reference current with a constant ratio.

* * * * *